April 12, 1949. W. R. MAIN 2,466,720
CONDUIT BUSHING
Filed April 28, 1944
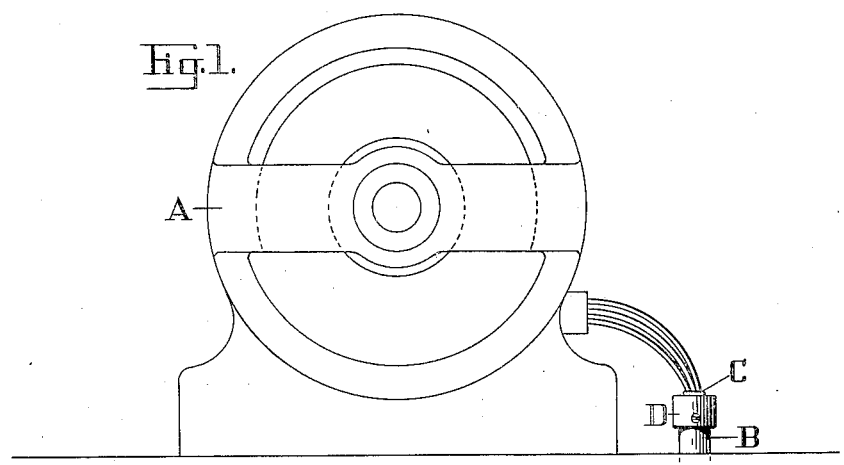
Fig.1.
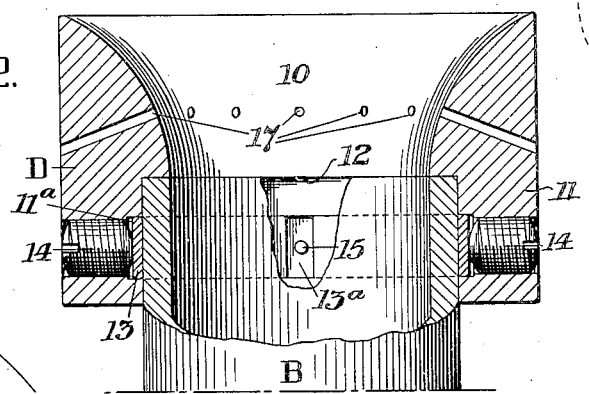
Fig.2.
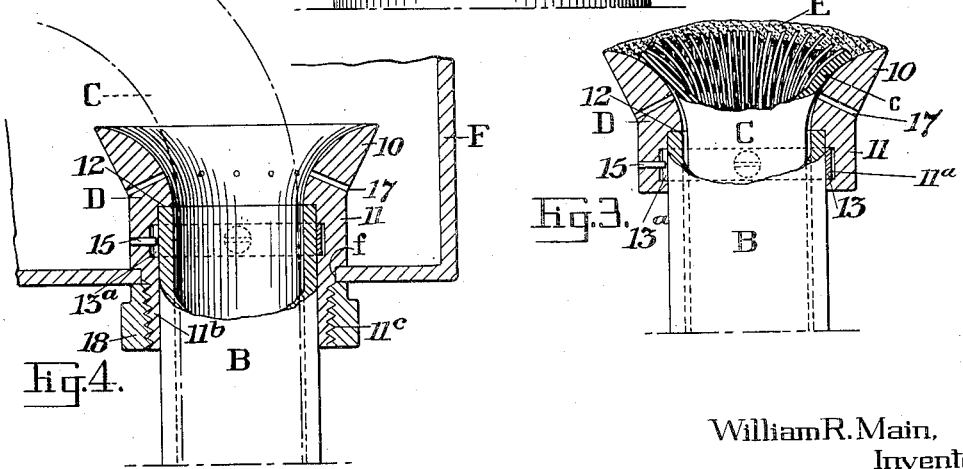
Fig.3.
Fig.4.
William R. Main,
Inventor
by Murray C. Boyer
Atty.

Patented Apr. 12, 1949

2,466,720

UNITED STATES PATENT OFFICE 2,466,720

CONDUIT BUSHING

William R. Main, Delanco, N. J.

Application April 28, 1944, Serial No. 533,104

4 Claims. (Cl. 174—77)

My invention relates to fittings serving as protective means for cables containing electric transmission wires; more particularly lead-covered cables which are usually disposed in pipes, conduits, and/or the like.

A common practice is to employ ordinary metal pipe—usually iron pipe—to serve as conduits for the reception of these cables, and in the operation of passing lead-sheathed cable into and out of the same considerable difficulty has ensued owing to the sharp and roughened edges at the points of inlet and emergence from these pipe conduits.

For the purpose of protecting the lead sheath and preventing scarring and scoring of the same, not to speak of actual breaking of such sheath, it is desirable to provide the ends of such pipe conduits with fittings having a smooth wall surface permitting easy passage of the cable without damage to its lead sheath.

And it is desirable that these fittings be capable of application to the ends of the pipe conduits—particularly in field operations—with the greatest facility and that they be held in place by means wholly carried by the fittings.

The principal object of my invention is to provide a fitting in the form of a bushing that may be readily and quickly attached to the end or ends of a pipe conduit and held thereto by friction means.

A further object of my invention is to provide a bell-mouthed bushing attachable to the end or ends of pipe conduits to enable a lead-sheathed cable to be passed into and out of the same without damage.

A further object of my invention is to provide the bushing with friction means to insure that it will be held in place for such time as may be necessary, or for permanent engagement.

A further object of my invention is to provide the bushing with a friction band that may be clamped into engagement with the conduit pipe by means of set screws.

A further object of my invention is to provide the bushing with a threaded portion with which a retaining nut disposed externally of the pipe conduit may be engaged whereby the conduit and the bushing may be associated with a box or other fitting forming part of the electrical equipment.

And a further object of my invention is to provide the bell-mouth of the bushing with ventilating apertures.

These and other features of my invention are more fully set forth hereinafter; reference being had to the accompanying drawings, more or less diagrammatic in character, in which:

Figure 1 is a view illustrating, diagrammatically, a form of electrical equipment to which the wires of a cable may be connected and the position of a bushing within the scope of my invention mounted at one end of a conduit carrying such cable.

Fig. 2 is an enlarged sectional view of a conduit bushing within the scope of my invention.

Fig. 3 is a similar view, on a smaller scale, illustrating the use of my improved bushing at the terminus of a cable.

Fig. 4 is a similar view of another form of conduit bushing within the scope of my invention.

In the accompanying drawings, more particularly Fig. 1, a piece of electrical apparatus, wholly diagrammatic, is indicated at A; a pipe conduit at B, a cable issuing from the conduit at C, and a conduit bushing within the scope of my invention, at D.

Referring to Fig. 2, which is an enlarged sectional view of my improved bushing, indicated at D, as applied to the end of a pipe conduit, indicated at B, it will be found to consist of a bell-mouthed member 10, with a short tubular or sleeve-like portion 11, having an internal diameter substantially the same as the external diameter of the pipe conduit B, and provided with an internal shoulder 12 against which the end of the pipe conduit may abut.

In the form of structure illustrated in Fig. 2, the tubular or sleeve-like portion 11 is of the same diameter externally throughout its length. The curved surface of the bell-mouth may be conveniently one-quarter of a circle, and its inner margin preferably terminates at the shoulder 12; the internal diameter of such portion being substantially the same as the internal diameter of the pipe conduit. I do not wish to be limited to any particular curvature, however, and arcs of greater or less degree are within the scope of my invention.

The wall of the tubular or sleeve-like portion 11 of the bushing is internally recessed at 11$^a$, and a flat metal strip in the form of an annulus 13, is disposed within this recess and engages the wall of the pipe conduit. In order that this strip may be set up against the pipe conduit B to maintain the bushing in the desired position with respect to the same, I may employ one or more set screws 14, which may pass through the wall of the tubular or sleeve-like portion 11 into engagement with the metal strip forming the annulus 13. The annulus is split at 13$^a$ and in order that it may be maintained in proper position to insure that such split portion is never disposed opposite a set screw, a small pin 15 may be let into the metal of the tubular or sleeve-like portion of the bushing, with its exposed end spaced away from the surface of the pipe conduit when the parts are connected together.

The arrangement illustrated in Fig. 3, showing a bushing of slightly different contour, is an instance where the lead-sheathed cable, such as illustrated at C, terminates at the end of a pipe conduit B equipped with a bushing D within the scope of my invention. In such instance, the lead sheath c covering the wires is cut away or it may extend to the outer edge of the bell-mouth of the bushing, and the end of the cable with the contained wires is splayed to substantially fill the enlarged space provided by the bell-mouth of the bushing, and then the same is covered over or filled with a suitable form of waterproof cementitious material such as an asphaltic mastic, indicated at E.

In the use of my improved bushing it is desirable to provide some means of ventilating the space between the cable C and the pipe conduit B carrying the same, inasmuch as there is a tendency for heat to be generated in such space when the end of the conduit is sealed as indicated in Fig. 3. For this purpose the bell-mouth portion 10 of the bushing may be provided with a series of apertures, which may be diagonally disposed, as indicated at 17.

The form of structure illustrated in Fig. 4, wherein the contour of the bushing is the same as that shown in Fig. 3, is designed more particularly for use in connecting the conduit to box connectors by means of a fitting or bushing within the scope of my invention. In this instance, the tubular or sleeve-like portion 11 is extended with a reduced portion 11b, and such reduced portion is externally threaded at 11c. The box connector is indicated at F and is apertured at f for the passage of the bushing. A nut 18, which has been slipped over the pipe conduit before the bushing has been applied is then engaged with the threaded portion and set up against the wall of the connector box to secure the pipe conduit and the bushing in the proper relation.

While I have described the features of my invention with some particularity and have shown in the accompanying drawings several embodiments of my improved conduit bushing, it will be understood that such disclosure is for illustrative purposes only and not as a limitation since modifications may be made without departing from the spirit of my invention; all of which is deemed to be within the scope of the appended claims.

I claim:

1. A bushing for pipes of conduit type and the like, comprising a one-piece tubular member of circular contour for placement over the end of such pipe; said tubular member having a bell-mouthed entrance portion with an internal shoulder beneath the same and against which the end of the pipe abuts and a depending tubular portion in relatively frictional engagement with the pipe; said latter portion having an internal annular recess, a split clamping ring disposed in said annular recess and in frictional engagement with the pipe, means carried by the bushing for pressing said clamping ring into gripping engagement with the pipe; the wall of said bell-mouthed portion having ventilating apertures, and means carried by the bushing and disposed between the ends of the clamping ring for maintaining the latter in position to be engaged by the means pressing the clamping ring against the pipe.

2. A bushing for pipes of conduit type, comprising a one-piece tubular member of circular contour having a bell-mouth opening at one end and a sleeve-like portion at the opposite end internally recessed to fit over the end of the pipe and having an internal shoulder below the inner portion of the bell-mouth against which the end of the pipe abuts, a split clamping ring disposed between the bushing member and the pipe, means for setting up said clamping ring into gripping engagement with the pipe; said sleeve-like portion of the bushing being externally reduced and provided with a continuous thread, and a removable nut adapted to said threaded portion.

3. A fitting for a pipe of conduit type comprising a one-piece tubular member of circular contour having a bell-mouthed opening at one end and a sleeve-like portion at the opposite end; said sleeve-like portion being internally recessed to fit over the end of the pipe and having an internal shoulder against which the end of the pipe abuts with an annular recess in its inner wall surface, a split clamping ring disposed in said annular recess, means for setting up said ring into gripping engagement with the pipe; said sleeve-like portion being externally threaded, in combination with the wall of a box connector through an opening in which wall the sleeve-like portion may pass, and a removable nut adapted to said threaded portion to secure the fitting to said connector box wall.

4. In a fitting for application to the end of a pipe of conduit type containing electric transmission wires disposed in a metal-sheathed cable, the combination of a one-piece tubular bushing member of circular contour having an internally recessed portion to fit over the end of the pipe with an internal shoulder against which such end abuts, and a bell-mouthed portion into which the ends of the cable wires may be spread for a terminal ending; said tubular member being further provided with an internal annular recess below the bell-mouth portion, a split clamping ring disposed within said annular recess, means carried by the bushing for setting up said clamping ring into gripping engagement with the pipe, a filling of waterproof material of a cementitious nature covering said wire ends and metal sheathing and supported by the bell-mouth of the fitting; said bell-mouth portion having apertures passing through its wall for ventilating the pipe when the wire ends have been sealed into said bell-mouth.

WILLIAM R. MAIN.

REFERENCES CITED

The following references are of record in the file of this patent:

UNITED STATES PATENTS

| Number | Name | Date |
| --- | --- | --- |
| 280,919 | Du Shane | July 10, 1883 |
| 322,018 | Smith et al. | July 14, 1885 |
| 804,590 | Ervin et al. | Nov. 14, 1905 |
| 1,231,273 | Lefkowitz | June 26, 1917 |
| 1,283,574 | Schuster et al. | Nov. 5, 1918 |
| 1,720,072 | Cox | July 9, 1929 |
| 1,768,095 | Arthur | June 24, 1930 |
| 1,775,128 | Hunter | Sept. 9, 1930 |
| 1,857,197 | Knoderer | May 10, 1932 |
| 1,864,712 | Cafiero | June 28, 1932 |
| 1,898,623 | Gammeter | Feb. 21, 1933 |
| 1,935,561 | Hooley | Nov. 14, 1933 |